UNITED STATES PATENT OFFICE.

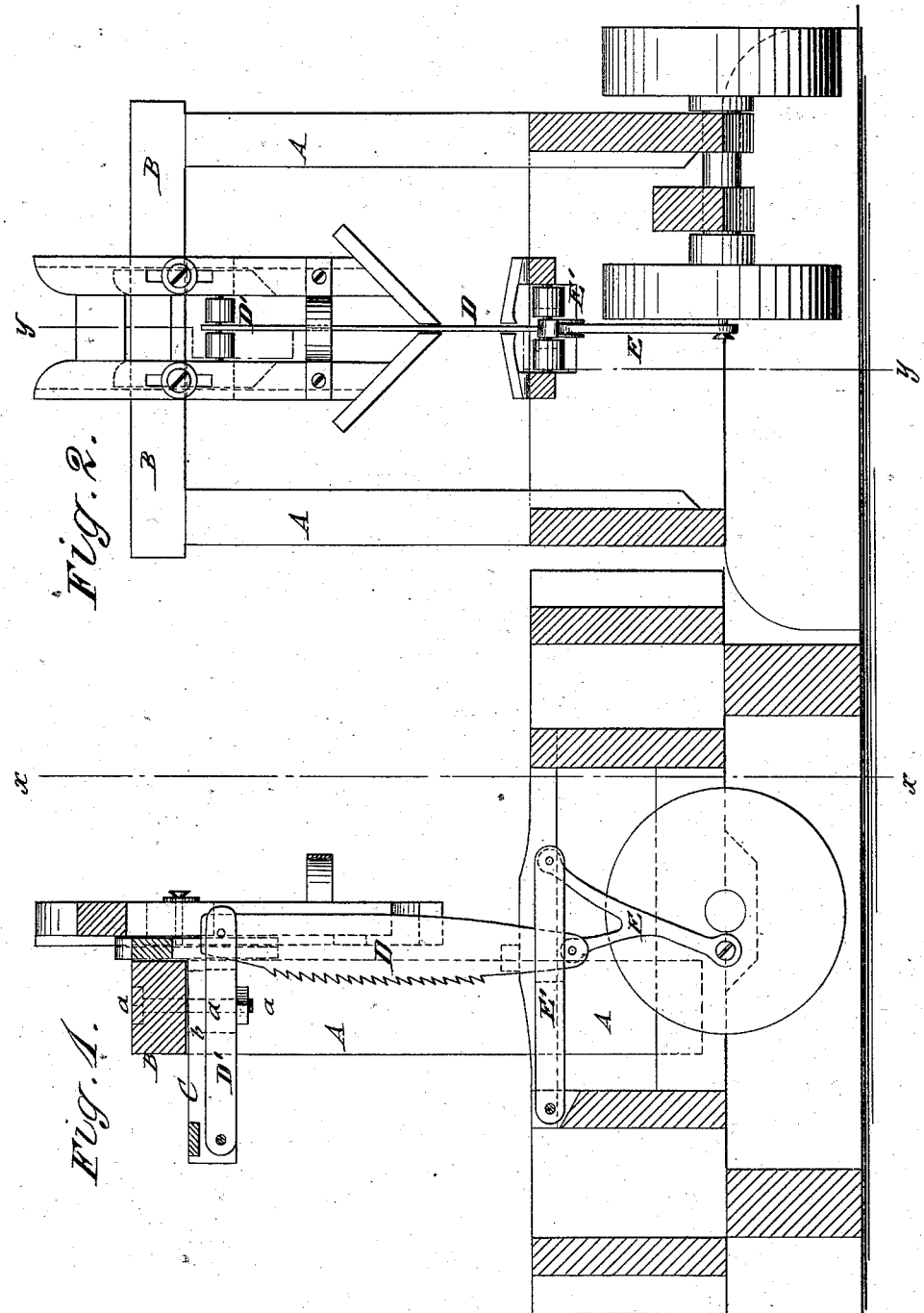

JOHN J. REINHART AND WILLIAM HOUGHTON, OF LOOGOOTEE, INDIANA.

IMPROVEMENT IN SAWING-MACHINES.

Specification forming part of Letters Patent No. 194,372, dated August 21, 1877; application filed July 9, 1877.

*To all whom it may concern:*

Be it known that we, JOHN J. REINHART and WILLIAM HOUGHTON, of Loogootee, in the county of Martin and State of Indiana, have invented a new and Improved Sawing-Machine, of which the following is a specification:

In the accompanying drawing, Figure 1 represents a vertical longitudinal section of our improved sawing-machine on line $y\,y$, Fig. 2; and Fig. 2, a rear elevation of the same, partly in section on line $x\,x$, Fig. 1.

Similar letters of reference indicate corresponding parts.

The invention relates to an improved cheap and portable sawing-machine for the use of farmers and others, which can be run with light power.

For constructing a cheap, portable, and easily-running sawing-machine it is necessary to use a vertically-reciprocating saw, do away with the long pitman, and dispense with the cross-heads and slides, and provide, in addition thereto, some appliance by which the saw is caused to recede from the kerf after making the stroke, so as to pass up clear, and is brought forward again at the top of the stroke to descend perpendicularly.

The invention is intended to meet these requirements; and consists of a vertically-reciprocating saw, operated by a forked pitman and vibrating arm at upper end, pivoted to an adjustable muley-head.

In the drawing, A represents the upright supporting-frame, and B the top cross-piece, to which the muley-head C is attached in adjustable manner by screw-bolts $a$, which pass through slots $b$ of the head, so as to admit the moving of the head back or forward, or to right or left, give thereby the saw more or less rake, and adjust the same to the line of kerf.

The upper end of the saw D is attached to a vibrating arm, D′, that is pivoted to the slotted front end of muley-head C. The lower end of saw D is pivoted to the front arm of a forked pitman, E, while the rear arm of the same is pivoted to a lower vibrating arm, E′, which imparts, in connection with the eccentric pivoting of the pitman to the crank-disk, the desired motion to the saw—namely, to descend in a perpendicular line and recede back from the cut while ascending free from the sawdust that is lodged therein.

The vibrating arm may also be pivoted to a straight pitman, but above the saw-pivot, though it is preferable to use a forked pitman. By this motion of the saw a very short pitman and a short, quick stroke are obtained, which avoids the necessity of a long stroke, as is the case in saws that descend and ascend in the same line, and which require each cutting-tooth to pass entirely through the log to enable the saw to shed the dust from between the teeth.

By changing the relative bearings of pitman and lower vibrating arm, any desired motion of the saw can be obtained.

By the receding of the saw when ascending, a saw with curved or hooked cutting-teeth may be used, of which each tooth operates in the nature of a chisel, cutting at right angles to the grain, so as to require less power than any other.

We are aware that saws have been made to vibrate at the lower end by means of a hinge near the top end of pitman. In this case, however, the saw is made to ascend and descend in curved lines, which gives the saw an uneven cut, and is therefore very objectionable.

Having thus described our invention, we claim as new and desire to secure by Letters Patent—

1. The combination, with a vertically-reciprocating saw, D, pivoted at upper end to a vibrating arm, D′, of a forked pitman, eccentrically pivoted to the drive-wheel, and having one of its fork-prongs pivoted to saw, while the other is pivoted to a pivoted bar, E′, as and for the purpose described.

2. The saw, arm, and upper muley-boards, in combination with screw-bolts $a$ and muley-head, slotted at $b$, as and for the purpose specified.

JOHN J. REINHART.
WILLIAM HOUGHTON.

Witnesses:
LEMUEL L. DILLEY,
HIRAM DAVIS.